United States Patent [19]

Smeyers

[11] Patent Number: 4,623,094

[45] Date of Patent: Nov. 18, 1986

[54] DISTRIBUTOR OR DRIPPER FOR THE MICRO-IRRIGATION OF SOILS

[75] Inventor: Pierre A. Smeyers, Brussels, Belgium

[73] Assignee: Raymond J. Nakachian, Saudi Arabia

[21] Appl. No.: 580,998

[22] Filed: Feb. 16, 1984

[30] Foreign Application Priority Data

Feb. 22, 1983 [BE] Belgium .................................. 210175

[51] Int. Cl.⁴ ........................ B05B 1/30; B05B 15/02
[52] U.S. Cl. .................................... 239/109; 239/542
[58] Field of Search ..................... 239/542, 109, 533.1; 138/42

[56] References Cited

U.S. PATENT DOCUMENTS

| | | | |
|---|---|---|---|
| 3,061,199 | 10/1962 | Billeter | 239/109 |
| 3,203,629 | 8/1965 | Goddard | 239/109 X |
| 3,482,785 | 12/1969 | Chapin et al. | 239/542 |
| 3,729,142 | 4/1973 | Rangel-Garza et al. | 239/542 |
| 3,806,036 | 4/1974 | Olson | 239/542 X |
| 3,882,892 | 5/1975 | Menzel | 239/542 X |
| 4,223,838 | 9/1980 | Maria-Vittorio-Torrisi | 239/109 |

Primary Examiner—Jeffrey V. Nase
Attorney, Agent, or Firm—Sughrue, Mion, Zinn, Macpeak, and Seas

[57] ABSTRACT

A dripper or distributor comprises mainly a closing member which may reciprocate in a chamber between an inlet and an outlet, the closing member carrying an elastic membrane provided with peripheral notches acting to filter the irrigating liquid before the liquid reaches a sinuous groove downstream of the membrane. Elastic radial arms attached to the closing member urge the closing member toward a seat adjacent to the inlet when the pressure applied to the irrigating liquid becomes lower than a predetermined value. When the pressure applied to the liquid is higher than the predetermined value, the closing member is moved toward a seat adjacent to the outlet. During the movements of the closing member between the seats, the dripper is flushed and the particles retained by the filter during the operation of the dripper are ejected therefrom.

7 Claims, 17 Drawing Figures

DISTRIBUTOR OR DRIPPER FOR THE MICRO-IRRIGATION OF SOILS

PRIOR ART

Micro-irrigation is a known method in which distributors placed in predetermined areas of a cultivated surface and connected to a system of supply of water under pressure continuously or periodically bring irrigation water to which are possibly added fertilizers or phytopharmaceutical products to said areas, so that the irrigation water is only brought to the growing areas of the roots or rootlets of seeds or plants, where the latter need water.

It is known to use, for the micro-irrigation of soils, distributors which dispense water drop by drop or in the form of microjets, these distributors being particularly drippers which may either be provided with a long circuit comprising possibly capillary ducts which have a rectilinear, helical or spiral shape or are provided with deflectors, or with a short circuit having a single or double opening, said drippers being sometimes self-regulating, i.e. able to discharge constant amounts of liquid, even if the water pressure varies in the water supply system.

These known drippers may be mounted on branches of a supply tube, or in line in said tube.

A particular known dripper of the short circuit type comprises a chamber provided with an inlet and an outlet, between which a closing or valve element, for example a ball, may be moved by the stream of liquid created in the chamber by a variation of the pressure to which the liquid is submitted. In the normal position, the dripper is mounted on branches of a liquid supply tube, in a vertical position, the outlet being on the upper side, so that, when no water is admitted into the inlet, the closing element rests by gravity on a lower seat around said inlet.

When pressure is applied in the supply tube or conduit, water enters into the inlet and removes the closing element from its lower seat. The closing element driven by the water flow then closes the outlet, by becoming seated on the upper seat formed around said outlet. One or more grooves provided in the upper seat allow a dropping of water when the closing element is applied on said upper seat.

During the displacement of the closing element from one seat to the other, a fraction of water under pressure may escape through the outlet, so as to rinse and clean the seat of the latter, as well as the groove or grooves used for discharging the water drop by drop. When the water supply is stopped, for example by closing a cock or valve on the supply conduit, so that no water is admitted into the latter, the water pressure decreases in the chamber of the dripper and the closing element becomes applied by gravity onto the seat of the inlet. A dripper of this type cannot be placed in any position, since it works only when it is in a vertical position.

Such a drawback does not exist in another known dripper, in which the ball-shaped closing element has been replaced by a valve element maintained on the inlet by a spring, the pressure of the latter being less than the water pressure, when water is supplied to the supply tube or conduit.

A common drawback of the two known drippers of the short circuit type described above is that they have a tendency to become clogged.

U.S. Pat. No. 4,059,228 also describes a self-regulating and self-cleaning dripper, in which the closing element, which may have a cylindrical or frusto-conical shape, must counteract the effects of a counterpressure for closing the outlet. Moreover, the part of the closing element acting as a filter and as a piston has the disadvantage of retaining impurities upstream the envelope or housing in which the closing element is movable. When the liquid supply source is closed and the supply tubes of the drippers are not fed with water, the closing element never completely closes the inlet so that, in the closed position, the drippers allow a complete draining of the water contained in the supply tubes of said drippers, so that an important amount of water is lost. Such a loss of water is particularly detrimental in deserts, where the loss of even small amounts of water cannot be admitted.

Moreover, the drippers disclosed in U.S. Pat. No. 4,059,228 as well as the known earlier described drippers must be arranged in complex circuits comprising a large filtering system.

Even when the water or irrigation liquid is filtered on filters retaining relatively small particles, there is still a danger that the individual drippers become clogged. Therefore, the potential users of drippers frequently hesitate to use them, since they become useless and must be replaced or cleaned when they become clogged.

OBJECTS OF THE INVENTION

It is an object of the present invention to provide a dripper which is reliable for a long time, i.e. which is particularly able to operate correctly during long periods, without choking or clogging.

Another object of this invention is to provide a dripper or microjet distributor of the self-filtrating type, i.e. a device which is provided with means retaining particles of predetermined size during its operation, so that such particles cannot obstruct said dripper.

Still another object of this invention is to provide a dripper provided with means for cleaning the filter contained in it, by removing the particles retained by said filter, such a self-cleaning taking place during the displacement of the closing element between its opening and closing positions and vice-versa.

Another object of the invention is to provide drippers adapted so as to maintain the water supply tubes full of water when the drippers are not in use, said drippers being adapted for avoiding the drainage of the supply conduit when the closing element closes the inlet of the dripper.

Finally, another object of the invention is a dripper adapted to inhibit any reflux of water possibly loaded with impurities, by aspiration of this water into the supply or feeding tube of the dripper, under the influence of a depression caused by a level difference between the dripper and a part of its supply tube.

BRIEF DESCRIPTION OF THE INVENTION

This invention relates to a distributor or dripper for the micro-irrigation of soils comprising an envelope or housing for a chamber provided with an inlet (to be connected to a conduit of an irrigation liquid under pressure) and with an outlet, and a closing element having the shape of a revolution body, which is contained in said chamber and is movable, under the influence of a liquid stream, between seats formed in the chamber and respectively adjacent to said inlet and outlet, as well as means for returning the closing element onto its seat adjacent to the inlet.

The dripper according to this invention is essentially characterized by the fact that it is provided with a circular array of notches through which the irrigation liquid can flow, but which retain particles of predetermined size present in said liquid when the closing element is applied on the seat adjacent to the outlet, the closing element being adapted so that the particles retained by said filtering notches are removed through the outlet by the rising effect caused by said liquid during the displacement of the closing element from the seat adjacent to the outlet toward the seat adjacent to the inlet in said chamber and vice-versa.

Said notches which may be V- or U-shaped or have the shape of slots can be provided, in accordance with the invention, in the periphery of the part having the largest diameter of the closing element, or in the edge of a circular hole provided in a membrane carried by the seat adjacent to the outlet of said envelope.

According to an important feature of the invention, the closing element or the membrane, which may at least partly be made of an elastic material, is provided downstream of the notches, with a groove which forms a continuous channel having such a profile that the liquid flowing therein is subjected to several direction changes, one end of said groove having an opening directed toward the inlet, whereas the other end of said groove has an opening directed toward the outlet. Said groove may also be provided in the seat adjacent the outlet.

The closing element is preferably frusto-conical and has its great base facing the inlet, whereas the seat adjacent to the outlet is also frusto-conical, the apex of the angle generating said outlet seat being equal to the apex of the frusto-conical closing member or element, the latter being preferably provided, in its part of greatest diameter, with a flexible lip having a peripheral edge wherein said notches are separated from each other by teeth.

In another embodiment of the dripper according to the invention, in which the abovesaid membrane is used, this membrane has a frusto-conical shape and is permanently applied on the frusto-conical seat which is adjacent to the outlet of the envelope, this membrane being provided, in its part of greatest diameter, with a circular hole, the edge of which is provided with said notches separated from each other by teeth.

The closing member is provided with a shank guided in a sheath provided in said envelope downstream the inlet of the chamber, the shank being provided, at least on part of its height, with substantially radial or helical fins and, at its free end, with a conical head.

The means for returning the closing element toward the seat adjacent to the inlet may consist either of a magnet acting on a ferromagnetic material or of radial elastic arms which act as a spring and have one end fixed to the closing element, whereas the free ends of said elastic arms are supported by a circular recess of the envelope of the dripper. The radial elastic arms permanently pull the closing element toward the seat adjacent to the inlet, while inhibiting the flowing of said liquid through the dripper, as long as the pressure of this liquid is lower than a value determined by the elasticity of the radial arms.

DETAILED DESCRIPTION OF THE INVENTION

The following detailed description discloses, only by way of examples, five embodiments of a dripper according to this invention.

BRIEF DESCRIPTION OF THE DRAWINGS

In the attached drawings.

In the various figures, the same references are used for designating identical or similar elements.

DETAILED DESCRIPTION OF THE PREFERRED EMBODIMENTS

Figure 1:
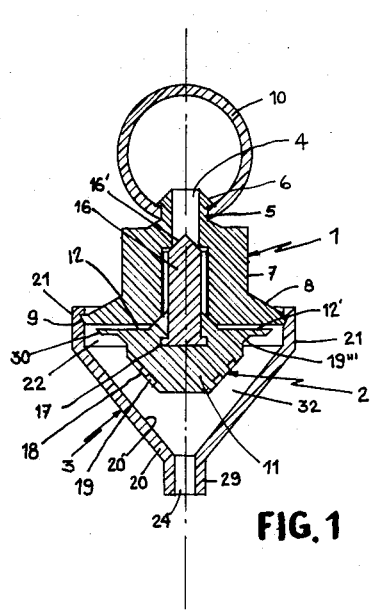
FIGS. 1, 2 and 3 are cross-sections of a first embodiment of a dripper showing the closing element in three different positions.

The drippers shown on the drawings essentially comprise three parts 1, 2 and 3, said parts being assembled by snapping, although they may be assembled by other means, for example by screwing or by welding.

Part 1 is a cover provided with an inlet 4 and comprising a neck 5 having a bevelled part 6 and a cylindrical body 7, acting as a sheath, which is fixed to the neck 5. At its end opposite to the neck 5, the sheath 7 has a peripheral flange 8 having a bevelled edge 9 in FIGS. 1 to 3.

Part 1 is attached by the bevelled end 6 of the neck 5 to a hole provided in a supply tube or conduit 10 which is itself connected to a source (not shown) supplying an irrigation liquid under pressure, a valve or a cock (not shown) being able to stop the liquid supply.

In the first embodiment of the dripper shown in FIGS. 1 to 6, the cylindrical body 7 of part 1 is preferably made of plastic material and is magnetized, magnetized particles being dispersed in said body 7, so that the latter is a permanent magnet. Instead of a permanent magnet, an electromagnet could possibly be used.

Piece 2 is the closing member or element of the dripper and comprises a revolution body 11 made of flexible elastic plastic material, such as a silicone resin or polytetrafluorethylene.

In the embodiment shown in FIGS. 1 to 6, the revolution body 11 has substantially the shape of an inverted cone frustum, the large base 12 of which is directed toward the inlet 4 of part 1.

The base 12 of the revolution conical body 11 has a central frusto-conical projection 13 intended to be applied on a bevelled end 14 of a bore 15 in the body 7, the bevelled end 14 constituting the seat of the inlet 4,15 of part 1.

The closing member 11 carries a cylindrical shank 16 made of a magnetic material or sensitive to a magnetic field or made of a material containing ferromagnetic particles. The shank 16 is engaged in the bore 15 of the sheath 7 of part 1, so as to be submitted to the permanent attraction force of the magnetized body 7. An end part provided with a flange 17 of the shank 16 is inserted in the frusto-conical closing member 11.

Figure 4:
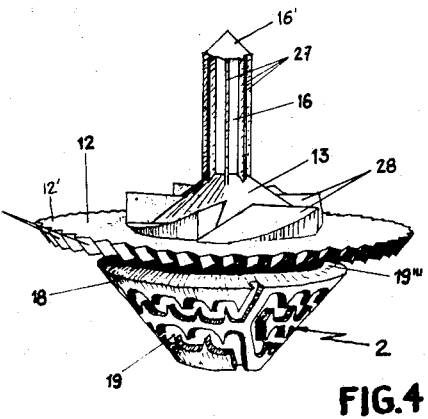
FIG. 4 is a perspective view showing an embodiment of the closing element of a dripper according to this invention.
Figure 13:
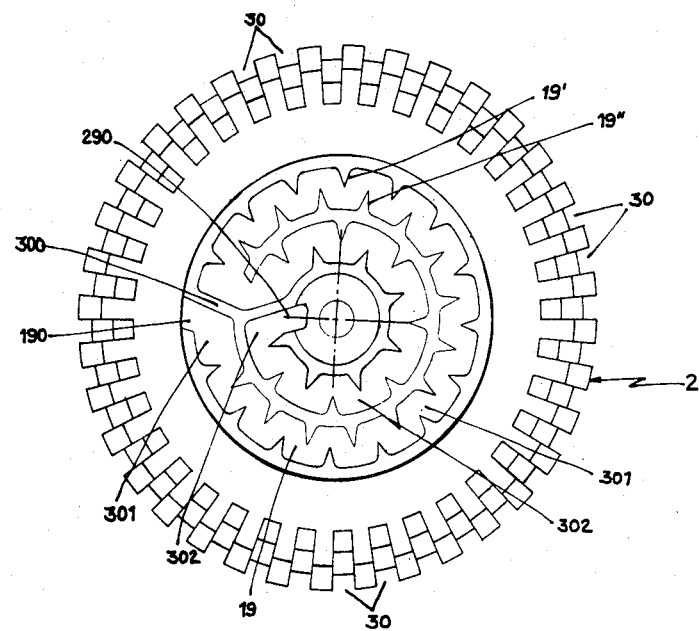
FIG. 13 is a plane view from below of the lower part of the closing element.

The side surface 18 of the closing member 11 is provided with a groove 19 having a sinuous shape, as shown in perspective in FIG. 4 and in plane in FIG. 13. This groove 19 forms a continuous channel which imposes to the liquid flowing therethrough numerous direction changes, as shown by the turning points 19',19" shown in FIG. 13. The groove 19 has an inlet 190 adjacent the large base 12 of the cone frustum and an outlet 290 in the vicinity of its small base.

In the embodiment shown in FIG. 13, the groove 19 has a return point shown by a wall 300, so that said groove 19 comprises two branches 301,302 which are substantially parallel to each other and which are interconnected along the wall 300. In the embodiment shown in FIG. 4, the groove 16 is provided in the body 11 by cutting it perpendicularly to the lateral surface 18 of said body, but it is preferred to realize said groove as shown in FIGS. 7 to 12 and 15, wherein the bottom 19' of the channel is oriented toward the bottom 12 of the cone frustum, the axis of the cross-section of the groove being parallel to the axis of the closing element.

An essential part of the closing member 11 is constituted by the edge of the large base 12 of said frusto-conical member 11. Said edge comprises a lip 12', in which are provided the notches 30 which appear also in FIG. 8. The lip 12' is preferably flexible. Below the lip 12', the closing element 11 has a peripheral groove 19'" acting as a chamber connected to the sinuous groove 19.

In the embodiment of the closing element 11 shown in FIG. 4, this element comprises moreover, between its central frusto-conical projection 13 and its base 12 provided with the lip 12', a series of inclined surfaces 28 which form blades. The projection 13 carrying the shank 16 is provided at its periphery with radial fins 27 and carries a conical head 16'. The function of the elements 27 and 28 will be explained hereafter.

Part 3 of the dripper is the envelope of the latter. It comprises a cylindrical upper edge 21 defining an inner chamber 22, a hollow frusto-conical part 20 forming the seat adjacent to the outlet of the dripper and a cylindrical end part 29 surrounding the outlet 24.

The closing element 11 is located within the envelope 20 and, in its lower position, its lateral surface 18 is applied against the inner lateral surface or seat 20' of part 20.

The operation of the first embodiment of the dripper is explained hereafter with reference to FIGS. 1 to 6.

In a first stage, where no water pressure exists in the conduit 10, the closing element 11 is applied on its upper seat 14 by the attraction exerted by the magnetized sheath 7 on the shank 16 of the closing element 11. The inlet 4,15 is closed and no irrigation liquid can flow into the dripper through the inlet 4.

Figure 2:
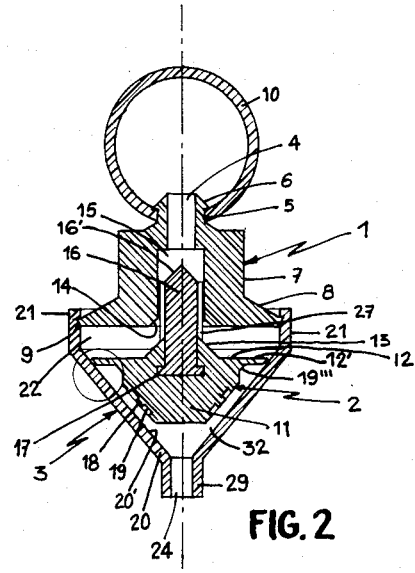

When a pressure is created in the conduit 10 and acts sufficiently in the conical head 16' of the shank 16, the magnetic force of the magnet is exceeded and the closing element 11 is removed from its seat 14 and becomes closer to the lower part of the envelope 20. This situation is shown in FIG. 2. Water flows then all around the closing element 11, beyond the edge of the lip 12 and through the notches 32, as well as along the edges of the groove 19, the water dripping finally through the outlet 24. During this operation, the liquid sweeps the particles which have been deposited during a previous operation in the chamber 22 and on the inner surface 20' of the envelope 3.

Figure 3:
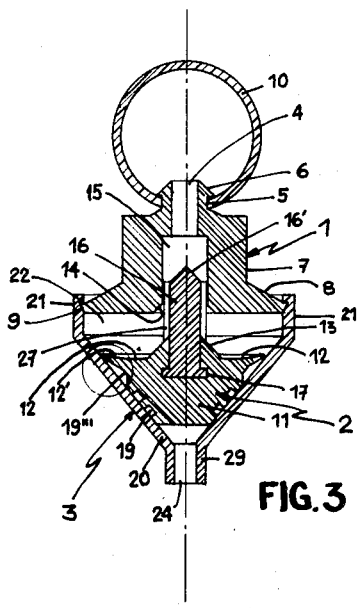
Figure 5:
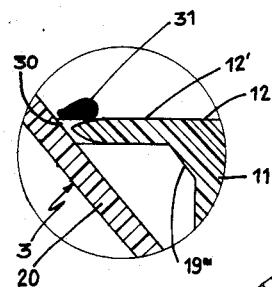
FIG. 5 is, at a larger scale, a view of a part, surrounded by a circle, at FIG. 2.
Figure 6:
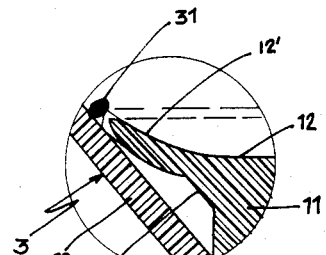
FIG. 6 is, also at a larger scale, a view of a part, surrounded by a circle, at FIG. 3.

The closing element 11, the peripheral lip 12' of which has a diameter comprised between the diameter of the large base and that of the small base of the frusto-conical envelope, becomes then seated through said lip 12' on the seat formed by the inner wall 20' of the part 20 of the envelope 3. This situation is shown in FIG. 3. Although the lip 12' is deformed, the notches 30 still allow the flow of liquid therethrough, but stop the particles 31 contained in the liquid which are too big, as shown in FIGS. 5 and 6. This shows the self-filtering effect of the dripper according to this invention. The liquid which has passed through the filtering notches 30 and arrives in the passage 32, enters then into the groove 19 through its inlet 190, flows slowly along said groove and leaves the latter through its outlet 290, from where the liquid goes into the outlet 24, from which it flows drop by drop or as a microjet.

The fins 27 and the blades 28 act during the movement of the closing element 11 from the closed position shown in FIG. 1 toward the position shown in FIG. 2. The fins 28 act as the blades of a turbine and cause a rotation of the closing element 11 about its symmetry axis. Such a rotation changes each time the position of the closing element 11 with respect to the part 20 of the envelope 3. Another function of the rotation of the closing element 11 is the scraping by the fins or blades 27 of the inner walls of the inner passage 15 of the sheath 7, so as to remove particles possibly deposited on said walls.

Figure 7:
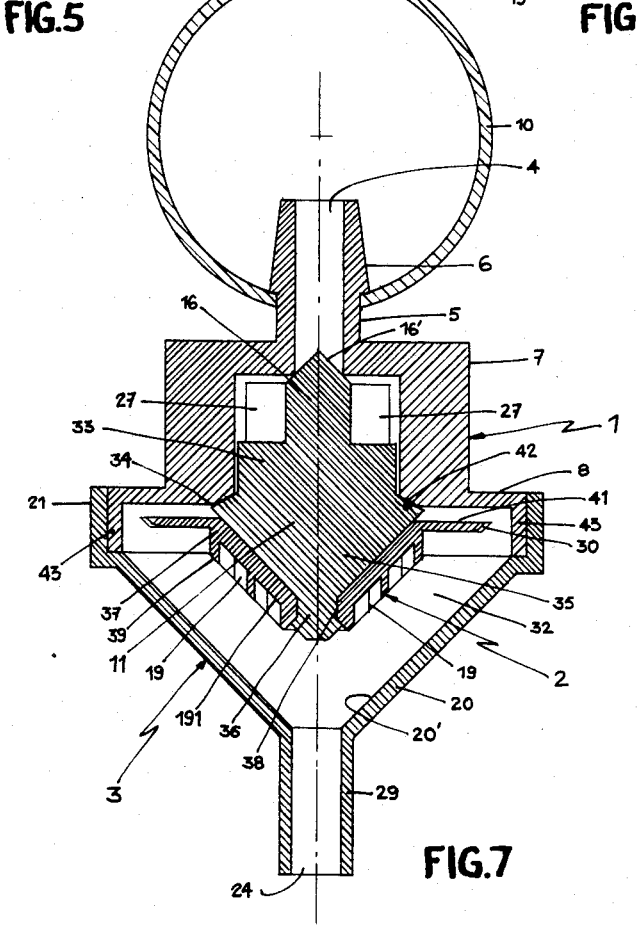
FIG. 7 is a cross-section of a second embodiment of a dripper according to the invention.
Figure 8:
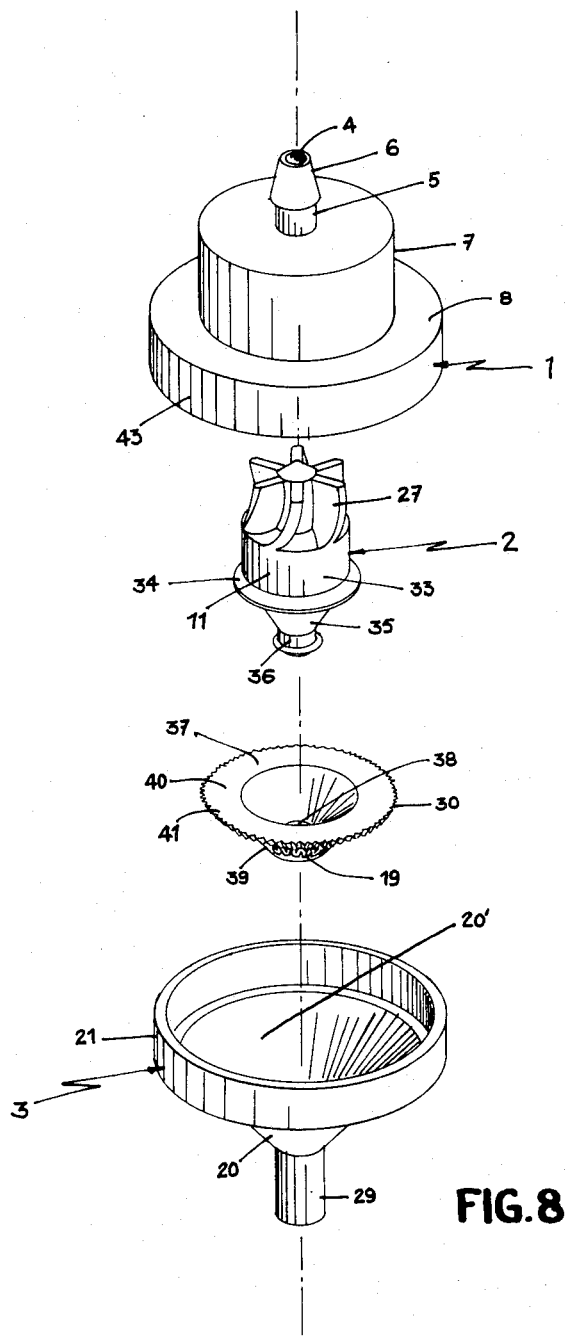
FIG. 8 is an exploded perspective view of the dripper shown in FIG. 7.

FIGS. 7 and 8 show a second embodiment of the dripper according to the invention. The same references are used for designating similar parts of the device, which correspond to parts already described in connection with the first embodiment shown in FIGS. 1 to 6. In FIGS. 7 and 8, the part 2 of the dripper comprises a closing element 11 containing ferro-magnetic particles or consisting of a ferro-magnetic material. The closing element 11 comprises an upper cylindrical part 33 connected through an intermediate frusto-conical part 34 to a lower part 35 having the shape of an inverted cone frustum, said lower part 35 being connected to a cylindrical-conical projection 36.

The closing element 11 carries an upper shank 16 provided with peripheral helical blades 27 and with a conical head 16'.

The closing element 11 is guided by its cylindrical part 33 in the chamber 15 provided in the cylindrical body 7, consisting of a magnet or containing magnetized particles, of part 1 of the dripper. The head 16' of the shank 16 seals perfectly the chamber 15 from the inlet 4, as shown in FIG. 7, when the dripper is closed.

An elastic and flexible membrane 37 is fixed, as shown particularly in FIG. 8, on the frusto-conical lower part 35 of the closing element 11. This membrane 37 has the shape of a cup having the shape of an inverted cone frustum provided at its lower end with a hole 38, so as to allow to fix it on the projection 36 of the closing element 11. The membrane 37 has a side wall 39 having the shape of an inverted cone frustum which is applied on the frusto-conical part 35 of the closing element 11. At its upper part, the membrane 37 is provided with an annular flange 40 having a peripheral lip or edge 41, in which filtering notches 30 are cut. A sinuous groove 19 similar to that illustrated in FIGS. 4 and 13 is provided in the side wall 39 of the membrane 37.

The dripper shown in FIGS. 7 and 8 operates in the same manner as the dripper of FIGS. 1 to 6. The sealing of the closing element 11 with respect to the inlet 4 and the conduit 10 is provided at the level of the head 16' of the shank 16 as well as at the level of the frusto-conical intermediate part 34 of the closing element 11, said part 34 being applied on a lower bevelled edge 42 of the chamber 15 (open at its lower end) of the cover 1. As shown in FIGS. 7 and 8, the peripheral flange 8 of the cover 1 is provided with a peripheral skirt 43 which may be fixed, for example by screwing, into the cylindrical upper flange 21 of the dripper envelope 3.

FIGS. 9 to 12 and 14 show a third embodiment of the dripper according to this invention. The parts of said third embodiment which correspond to parts of already described embodiments are designated by the same reference numerals. In the third embodiment, the central shank 16 of the closing element 11 is no more a magnetized or magnetizable body, as well as the sheath 7 of the cover 5, 7, 8. The function of retaining the closing element 11 onto the inlet 4 is effected by other means, as described hereafter.

The dripper shown in FIGS. 9 to 12 and 14 is similar to that of FIGS. 7 and 8, except that it comprises a closing element 11 which is not ferro-magnetic or does not contain ferro-magnetic particles, whereas the cover 1 does not comprise a permanent magnet. This means for returning the closing element 11 toward the closed position of the dripper (shown in FIG. 9) are elastic radial arms 44, the free ends of which are supported in an annular recess 45 provided in the upper portion of the envelope 3.

The elastic radial arms 44 fixed to the parts 34,35 of the closing element 11 permanently urge said closing element 11 toward the seat adjacent to the inlet 4, so as to inhibit any liquid flow through the dripper, as long as the pressure of this liquid in the conduit 10 is lower than a value determined by the elasticity of the radial arms 44.

Figure 9:
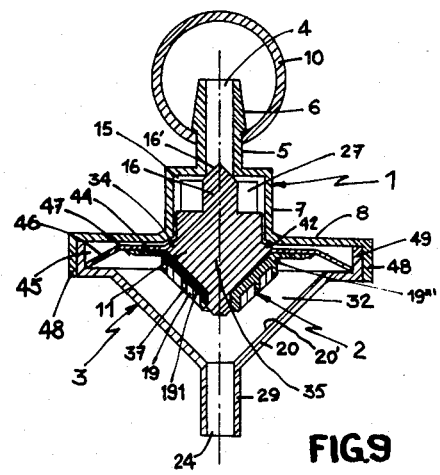
FIGS. 9 to 12 are cross-sections of a third embodiment of a dripper according to this invention showing the closing element in four different positions.

In the closed position of the dripper shown in FIG. 9, the radial elastic arms 44 have a rectilinear part which is substantially parallel to the flange 8 and an end part 46 which is bended (47) toward the upper part of the frusto-conical closing element.

Figure 14:
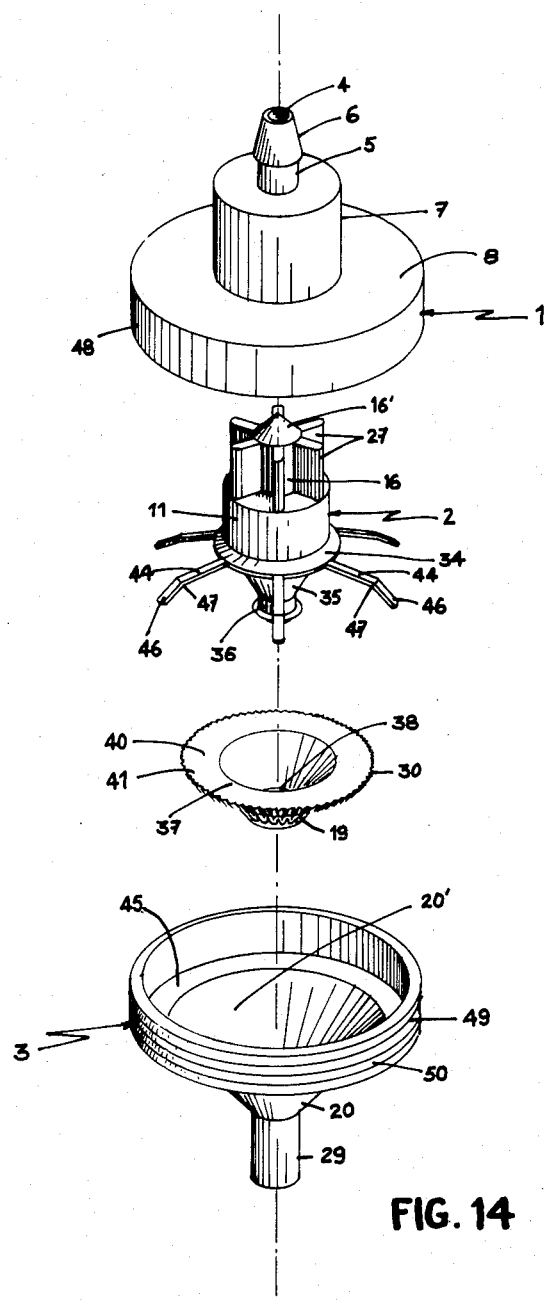
FIG. 14 is an exploded perspective view of the third embodiment shown in FIGS. 9 to 12 of the dripper according to this invention.

In the embodiment of the dripper shown in FIGS. 9 to 12 and 14, the cover 5, 7, 8 has a skirt 48 having an inner screwed face which is screwed on the cylindrical upper flange 49 fixed to the wall 20 of the envelope 3, said upper flange 49 being provided with outer threads 50, as shown in FIG. 14.

Figure 10:
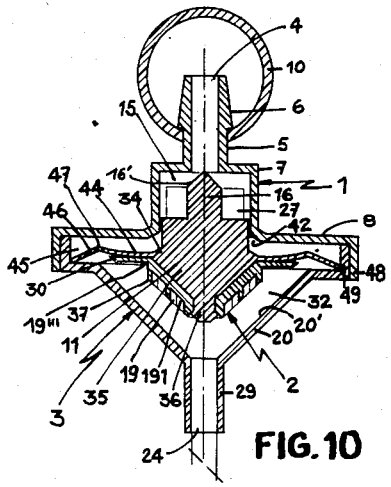
Figure 11:
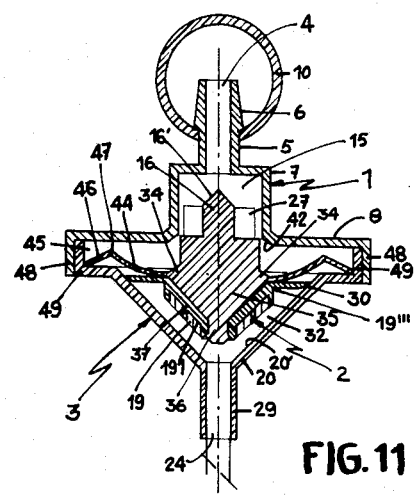
Figure 12:
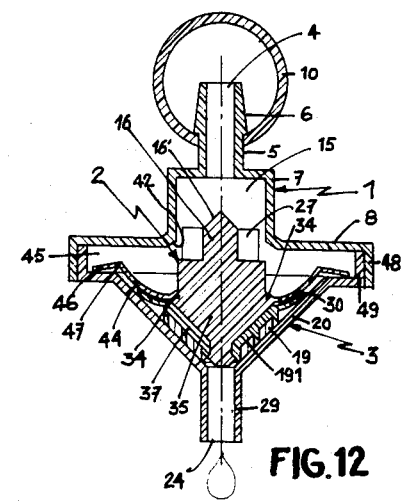

FIG. 9 shows the dripper in closed position, its closing element 11 being maintained by the radial arms 44 against the seats adjacent to the inlet 4. FIGS. 10 and 11 show the dripper when it becomes open and FIG. 12 shows the dripper in the operating position. In this latter position, the flexible membrane 37 carried by the closing element 11 is applied against the inner face 20' of the frusto-conical wall 20 of the envelope 3. FIGS. 9 to 12 show the various positions of the closing member 11, of the elastic radial arms 44 and of the membrane 37.

Figure 15:
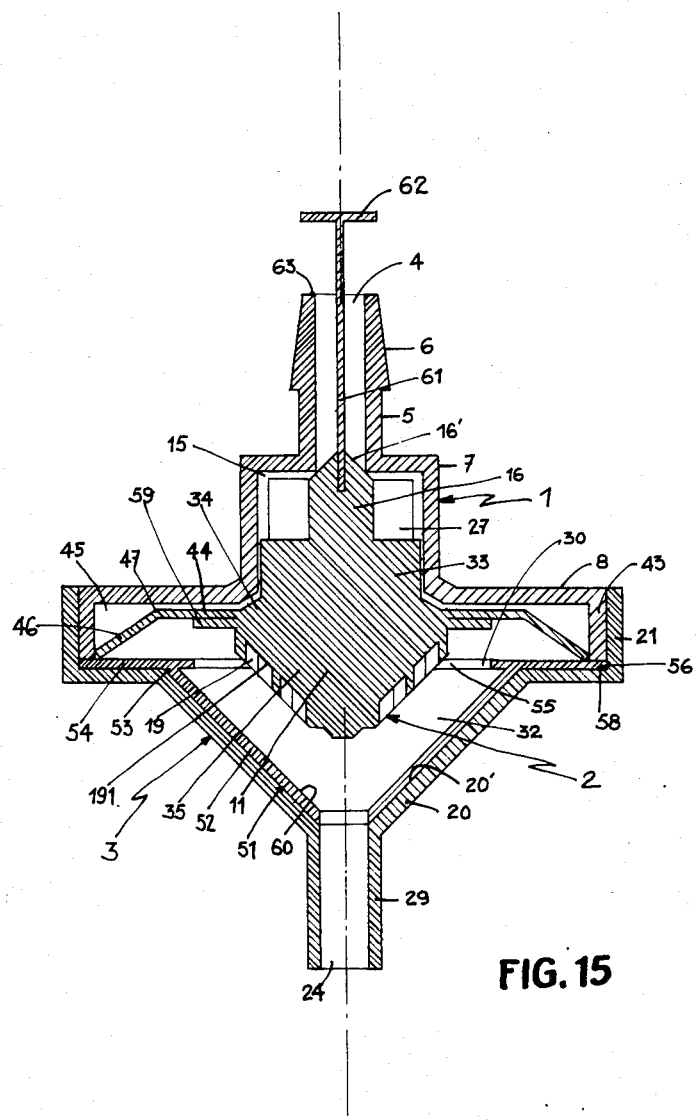
FIG. 15 is a cross-section of a fourth embodiment of a dripper according to the invention.
Figure 16:
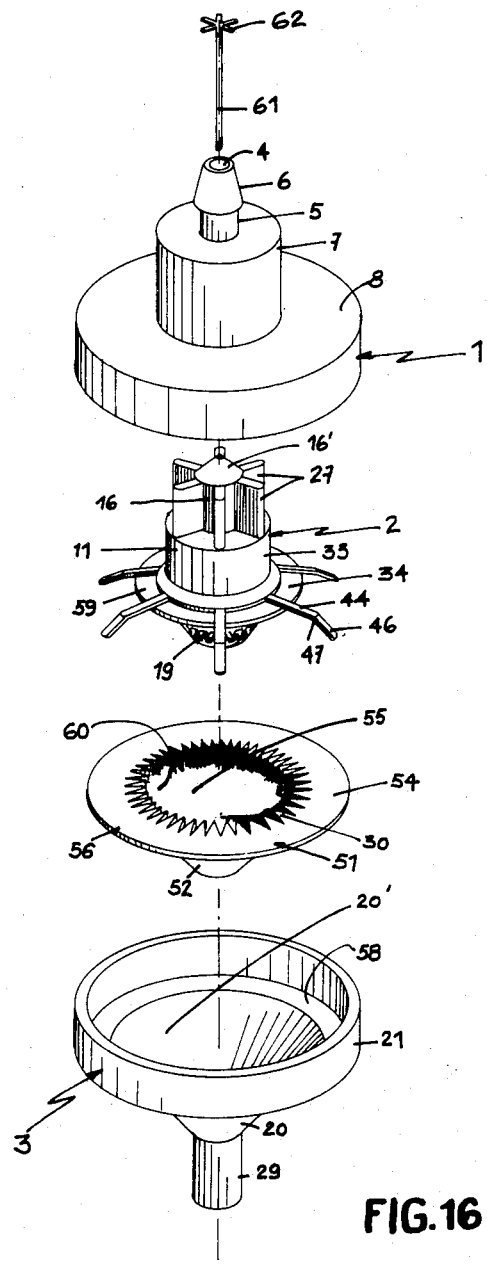
FIG. 16 is an exploded perspective view of the dripper shown in FIG. 15.

FIGS. 15 and 16 show a fourth embodiment of a dripper according to the invention. This dripper comprises a deformable or flexible membrane 51 comprising a part 52 having the shape of an inverted cone frustum, the upper edge 53 of part 52 being attached to a plate or flange 54 in which a central circular hole 55 is provided. The edge of this hole 55, which has a lower diameter than the diameter of the large base of part 52 of the membrane 51, is provided with filtering notches 30. The membrane 51 as applied on the inner face 20' of the side wall 20 of the envelope 3, when the dripper is in the operating position. The outer edge 56 of the flange 54 is inserted between the lower edge 57 of the skirt 43 of the cover 5, 7, 8 and the bottom 58 of the cylindrical flange 21 attached to the frusto-conical wall 20.

As shown in FIG. 15, the part of the flange 54, which is located outside the frusto-conical wall 52 of the membrane, rests permanently on the bottom 58 of the flange 21.

The cosing element 11 is similar to that of FIGS. 9 to 12 and 14, except that it is provided with a rigid ring 59 at the level of its frusto-conical part 34 connecting the cylindrical part 33 and the frusto-conical part 35. Said ring 59 masks patially the notches 30 provided in the edge of the circular hole 55 of the flange 54 of the membrane 51, when the dripper is in the operating position. Thus, the partially masked notches act as filters, the circular hole 55 of the flange 54 being closed by the movable closing member 11.

The part 35 having the shape of an inverted cone frustum of the rigid closing element 11 is provided, on it lateral face, with a sinuous groove 19 similar to that shown in perspective in FIG. 13. When the dripper is in the operating condition, the grooved lateral face of the frusto-conical part 35 of the closing member 11 is applied on the inner face 60 of the frusto-conical part 52 of the deformable membrane 51, so that said sinuous groove 19 forms a tortuous conduct, through which the liquid filtered through the notches 30 may flow, so as to leave the dropper drop by drop or as a microjet through the outlet 24.

As shown in FIGS. 15 and 16, the shank 16 of the closing member 11 carries a rod 61 which extends axially through the inlet 4 and carries at its free end a pre-filter 62 having a diameter which is larger than the diameter of said inlet 4. When the dropper is not in use, as shown in FIG. 15, the pre-filter 62 is removed from the free end 63 of the inlet 4. On the other hand, when the dripper is in the use position, i.e. when the closing element 11 is in the position shown in FIGS. 3 and 12, the prefilter 62 is applied against the free end 63 of the inlet 4 and filters the large impurities contained in the liquid under pressure admitted in the dripper. The pre-filter 62 may consist of a sieve or diametral bars which stop large particles, such as vegetable fragments, from entering into the dripper.

Figure 17:
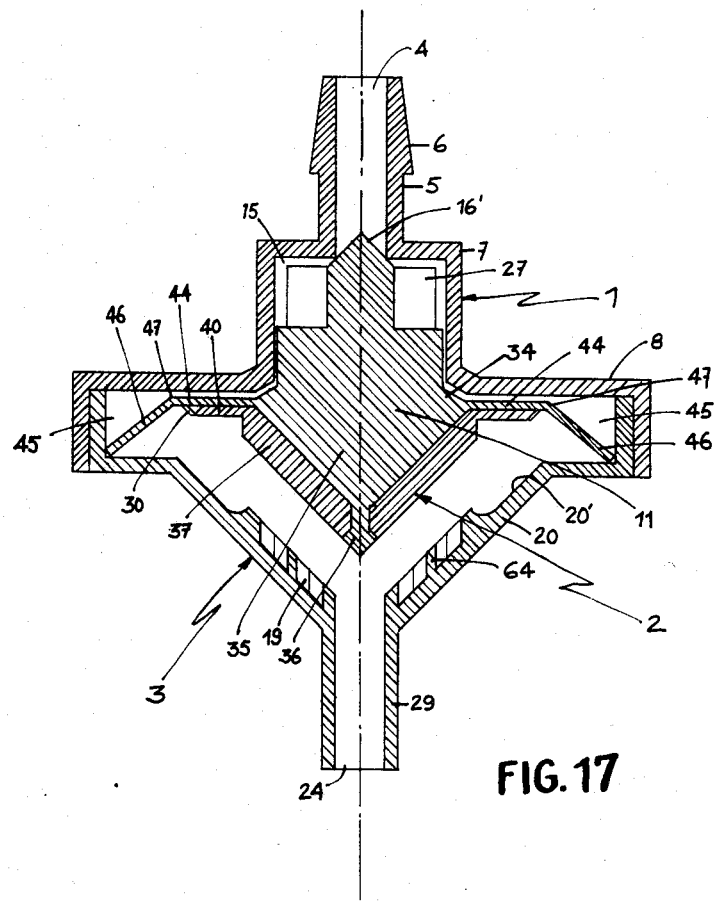
FIG. 17 is a cross-section of a fifth embodiment of the dripper according to this invention.

FIG. 17 shows a fifth embodiment of a dripper according to this invention. In this dripper, which is similar to that shown in FIGS. 9 to 12 and 14, the flexible membrane 37 has, in its frusto-conical part 39, a smooth outer surface toward the passage 32, whereas a sinuous groove 19 is provided in a thickened portion 64 of the wall 20.

What I claim is

1. A distributor or dripper for the micro-irrigation of soils, comprising:

a housing for an inner chamber, provided with an inlet for connection to a conduit of irrigation liquid and also provided with an outlet, said chamber having a cylindrical wall near the inlet and a frusto-conical wall near the outlet, the large base of the frusto-conical wall being adjacent to the cylindrical wall and having a diameter which is smaller than that of said cylindrical wall;

a closing member which is movable in said chamber between a first seat adjacent to said inlet and a second seat adjacent to said outlet, said closing member being provided with guiding means;

an elastic circular membrane carried by said closing member and having a diameter which is smaller than that of the cylindrical wall of the chamber, so that the irrigation liquid can flow toward the outlet around the periphery of said membrane when the latter is in the part of the chamber surrounded by said cylindrical wall, the membrane being provided with a circular array of notches separated from each other by teeth, so that said notches act as filters which allow a flow of irrigation liquid toward the outlet, but retain particles contained in said liquid, when said membrane is in the part of the chamber surrounded by said frusto-conical wall and is in contact with said frusto-conical wall;

a dripping groove provided downstream of said membrane and forming a channel having one end collecting the irrigation liquid filtered through the filtering notches and another end discharging the liquid into said outlet, said groove having such a profile that the filtered liquid is submitted therein to several direction changes, and elastic means for returning the closing member from the seat adjacent to the outlet to the seat adjacent to the inlet, when the pressure of the irrigation liquid is lower than a value determined by the elasticity of said elastic means, wherein said elastic means are spaced radial elastic arms acting as snapping springs, said radial elastic arms having one end attached to the closing member upstream of the notched membrane and another free end bearing against a circular shoulder provided in the housing of the distributor or dripper between the cylindrical wall and the frusto-conical wall of the chamber.

2. A dripper according to claim 1 wherein said closing member has a large base near said inlet and a further part near said frusto-conical wall, and in which the radial arms connected to the closing member comprise a part which, when the dripper is closed, is rectilinear and substantially parallel to the large base of the closing member, as well as an end part which is bent toward the frusto-conical wall.

3. A distributor or dripper according to claim 1, in which the guiding means of the closing member comprises a shank guided in a bore provided in the housing downstream of the inlet thereof.

4. A distributor or dripper according to claim 3, in which said shank comprises a cylindrical part and a further part provided with radial fins upstream of said cylindrical part.

5. A distributor or dripper according to claim 1, in which said notches and teeth are provided in the outer periphery of said circular membrane.

6. A distributor or dripper according to claim 1, in which a channel-forming groove is formed in an elastic frusto-conical member which is coaxial and parallel to the frusto-conical wall of said chamber and is carried by said movable closing member downstream of the elastic membrane.

7. A distributor or dripper according to claim 6, in which said frusto-conical member is integral with said elastic membrane.

* * * * *